(12) United States Patent
Ko et al.

(10) Patent No.: US 10,001,893 B2
(45) Date of Patent: Jun. 19, 2018

(54) TOUCH SCREEN AND DISPLAY APPARATUS

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Youngyik Ko, Beijing (CN); Xiangdan Dong, Beijing (CN); Benlian Wang, Beijing (CN); Lei Dai, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days. days.

(21) Appl. No.: 15/576,282

(22) PCT Filed: Mar. 27, 2017

(86) PCT No.: PCT/CN2017/078268
§ 371 (c)(1),
(2) Date: Nov. 21, 2017

(87) PCT Pub. No.: WO2017/181821
PCT Pub. Date: Oct. 26, 2017

(65) Prior Publication Data
US 2018/0143708 A1    May 24, 2018

(30) Foreign Application Priority Data

Apr. 22, 2016 (CN) .......................... 2016 1 0258393

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC .......... G06F 3/041; G06F 3/044; G06F 3/045
(Continued)

(56) References Cited

U.S. PATENT DOCUMENTS 8,698,768 B2    4/2014  Lee et al.
9,354,756 B2    5/2016  Huh et al.
(Continued)

FOREIGN PATENT DOCUMENTS

CN    102467293 A    5/2012
CN    103677418 A    3/2014
(Continued)

OTHER PUBLICATIONS

First Chinese Office Action, for Chinese Patent Application No. 201610258393.5, dated Feb. 14, 2018, 11 pages.
(Continued)

*Primary Examiner* — Tony Davis
(74) *Attorney, Agent, or Firm* — Kinney & Lange, P.A.

(57) ABSTRACT

Embodiments of the present disclosure disclose a touch screen and display apparatus. The touch screen includes: first electrode strips; second electrode strips; first, second, third and fourth connection lines arranged in at least one crossing region of first electrode strips with second electrode strips; transparent first and second connection parts provided within the at least one crossing region, the second connection part being insulated from the first connection part; the first connection part is electrically connected with two adjacent first electrodes via first and second connection lines respectively, and a sum of lengths of which is less than a distance between the two adjacent first electrodes; and the (Continued)

second connection part is electrically connected with two adjacent second electrodes via third and fourth connection lines respectively, a sum of lengths of which is less than a distance between the two adjacent second electrodes.

20 Claims, 5 Drawing Sheets

(58) Field of Classification Search
USPC .................................................. 345/170–176
See application file for complete search history.

(56) References Cited

U.S. PATENT DOCUMENTS

| | | | |
|---|---|---|---|
| 9,625,940 B2 | 4/2017 | Kim et al. | |
| 2011/0134055 A1* | 6/2011 | Jung | G06F 3/044 345/173 |
| 2011/0254804 A1* | 10/2011 | Kuo | G06F 3/0418 345/174 |
| 2012/0073124 A1* | 3/2012 | Chien | G06F 3/044 29/622 |
| 2012/0081300 A1* | 4/2012 | Chan | G06F 3/044 345/173 |
| 2012/0081333 A1 | 4/2012 | Ozeki et al. | |
| 2012/0105343 A1 | 5/2012 | Lee et al. | |
| 2014/0098304 A1 | 4/2014 | Kim et al. | |
| 2014/0204283 A1 | 7/2014 | Huh et al. | |
| 2014/0225864 A1* | 8/2014 | Chang | G06F 3/044 345/174 |
| 2014/0253495 A1* | 9/2014 | Kang | G06F 3/044 345/174 |
| 2017/0205918 A1 | 7/2017 | Kim et al. | |
| 2017/0235390 A1 | 8/2017 | Dong et al. | |
| 2017/0277308 A1 | 9/2017 | Zeng et al. | |

FOREIGN PATENT DOCUMENTS

| | | |
|---|---|---|
| CN | 103713785 A | 4/2014 |
| CN | 103970335 A | 8/2014 |
| CN | 104898912 A | 9/2015 |
| CN | 104932765 A | 9/2015 |
| CN | 104978055 A | 10/2015 |
| CN | 105786260 A | 7/2016 |
| CN | 205563522 U | 9/2016 |
| JP | 5685411 B2 | 3/2015 |
| KR | 20140042133 A | 4/2014 |

OTHER PUBLICATIONS

International Search Report & Written Opinion, for PCT Patent Application No. PCT/CN2017/078268, dated Jun. 30, 2017, 17 pages.

* cited by examiner

TOUCH SCREEN AND DISPLAY APPARATUS

CROSS-REFERENCE TO RELATED APPLICATION

This disclosure claims priority of Chinese Patent Application No. 201610258393.5 filed on Apr. 22, 2016 and entitled "TOUCH SCREEN AND DISPLAY APPARATUS", the disclosure of which is incorporated in entirety herein by reference.

BACKGROUND

Technical Field

The present disclosure relates to the field of display technology, and more particularly, to a touch screen and a display apparatus.

Description of the Related Art

Currently, a touch screen has become an input device widely applied in the field of display technology.

In prior arts, however, there is still a problem that when a touch screen is superimposed on a display panel, visuality of a display apparatus is degraded due to occurrence of black spots or lines on the touch screen caused by a metal wire provided on the touch screen.

SUMMARY

An object of embodiments of the present disclosure is to provide a touch screen and a display apparatus.

According to an aspect, there is provided a touch screen, comprising:

a plurality of first electrode strips arranged on a substrate and extending in a first direction, at least one of the plurality of first electrode strips comprising a plurality of first electrodes spaced apart from each other;

a plurality of second electrode strips extending in a second direction crossing the first direction and disposed in the same layer as the plurality of first electrode strips, at least one of the plurality of second electrode strips comprising a plurality of second electrodes spaced apart from each other;

a first connection line, a second connection line, a third connection line and a fourth connection line arranged in at least one crossing region of the plurality of first electrode strips with the plurality of second electrode strips; and a transparent first connection part and a transparent second connection part provided within the at least one crossing region in the same layer as the plurality of first electrode strips and the plurality of second electrode strips, the second connection part being insulated from the first connection part;

the first connection part is electrically connected with two adjacent said first electrodes via the first connection line and the second connection line respectively, and a sum of lengths of the first connection line and the second connection line is less than a distance between the two adjacent first electrodes; and the second connection part is electrically connected with two adjacent said second electrodes via the third connection line and the fourth connection line respectively, and a sum of lengths of the third connection line and the fourth connection line is less than a distance between the two adjacent second electrodes.

In an example, the first connection part is formed into a semi-encirclement structure and at least a portion of the second connection part is received in the semi-encirclement structure.

In an example, the semi-encirclement structure has an opening, through which the at least a portion of the second connection part is received in the semi-encirclement structure.

In an example, the second connection part is fully received in the semi-encirclement structure.

In an example, at least one of the third connection line and the fourth connection line extends across the first connection part to be electrically connected with the second electrode and is electrically insulated from the first connection part.

In an example, the semi-encirclement structure has a U shape, a semicircle shape, an elliptic shape, an arc shape or a sinuous shape.

In an example, the second connection part has a rectangular shape, a square shape, a circular shape, an elliptic shape or a rhombus shape.

In an example, the first connection line and the second connection line are each a metal wire; or, one of the first connection line and second connection line is a metal wire while the other is a transparent conductive layer; or the first connection line and the second connection line are each a transparent conductive layer.

In an example, the first electrode and the first connection part are each a transparent conductive layer;

the first connection line, and the first electrode and the first connection part respectively connected with the first connection line are made of a same material and formed into an integral structure if the first connection line is a transparent conductive layer; and/or the second connection line, and the first electrode and the first connection part respectively connected with the second connection line are made of a same material and formed into an integral structure if the second connection line is a transparent conductive layer.

In an example, the third connection line and the fourth connection line are each a metal wire.

In an example, one of the third connection line and the fourth connection line, which does not extend across the first connection part, is a transparent conductive layer, and is made of the same material as and formed into an integral structure with the second electrode and the second connection part connected therewith.

In an example, the material of the transparent conductive layer comprises one of Indium Zinc Oxide and Indium Tin Oxide, or any combination thereof.

In an example, the material of the metal wire comprises one of copper, aluminum and molybdenum, or any combination thereof.

In an example, one of the first electrode and the second electrode is a touch sensing electrode while the other is a touch drive electrode.

According to another aspect, there is provided a display apparatus comprising the above touch screen.

DETAILED DESCRIPTION OF PREFERRED EMBODIMENTS

Figure 1:
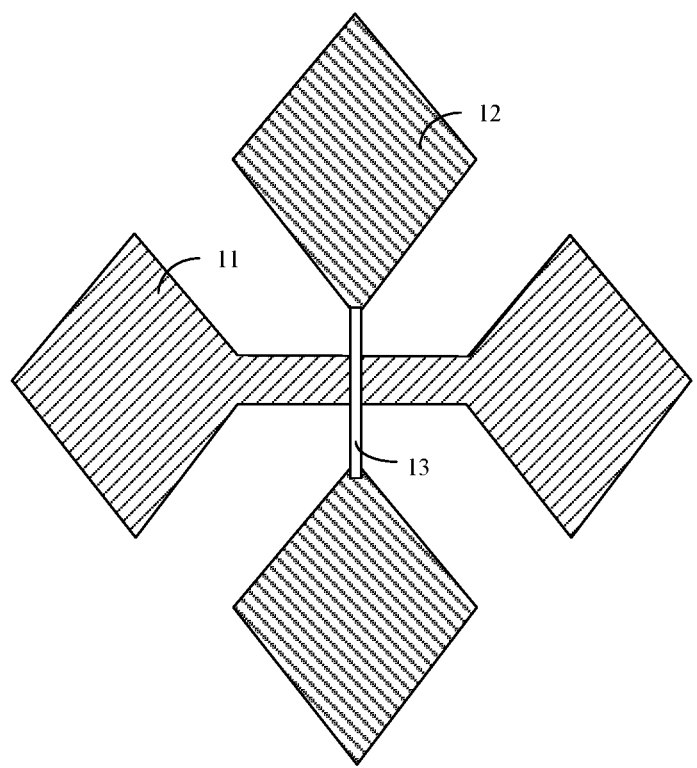
FIG. 1 is a schematic diagram showing a structure of a touch screen.

As shown in FIG. 1, a touch screen has a single layer bridged configuration including a plurality of first electrodes 11 and a plurality of second electrodes 12 (one of the first electrodes and the second electrodes is used as a touch drive electrode, while the other is used as a touch sensing electrode) arranged in a same layer. A strip-shaped connection part of transparent Indium Tin Oxide (ITO) connects two adjacent first electrodes 11 arranged in the same layer, while a metal wire 13, which is made of a low-resistance metal material, is used as a connection part to bridge and connect two adjacent second electrodes 12, and a transparent insulation layer is provided between the metal wire 13 and the strip-shaped connection part of transparent ITO. The metal wire 13 made of the metal material is not transparent, thus parts of a display area of a display panel may be shielded by the metal wire 13 when the touch screen is superposed on the display panel, so that black spots or lines may occur on the screen, degrading visuality of a display apparatus.

An embodiment of the present disclosure provides a touch screen, comprising:

a plurality of first electrode strips arranged on a substrate and extending in a first direction, at least one of the plurality of first electrode strips including a plurality of first electrodes spaced apart from each other;

a plurality of second electrode strips extending in a second direction crossing the first direction and disposed in the same layer as the plurality of first electrode strips, at least one of the plurality of second electrode strips including a plurality of second electrodes spaced apart from each other;

a first connection line, a second connection line, a third connection line and a fourth connection line arranged in at least one of crossing regions of the plurality of first electrode strips with the plurality of second electrode strips; and a transparent first connection part and a transparent second connection part provided within the at least one crossing region in the same layer as the plurality of first electrode strips and the plurality of second electrode strips, the second connection part being insulated from the first connection part;

the first connection part is electrically connected with two adjacent said first electrodes via a first connection line and a second connection line respectively, and a sum of lengths of the first connection line and the second connection line is less than a distance between the two adjacent first electrodes; and the second connection part is electrically connected with two adjacent said second electrodes via a third connection line and a fourth connection line respectively, and a sum of lengths of the third connection line and the fourth connection line is less than a distance between the two adjacent second electrodes.

In an example, at least one of the third connection line and the fourth connection line extends across the first connection part to be electrically connected with the second electrode and is electrically insulated from the first connection part.

In an embodiment of the present disclosure, in at least one crossing region between the first electrode and the second electrode, the first electrode is connected with the first connection part by a connection line having a length less than a distance between two adjacent first electrodes, and the second electrode is connected with the second connection part by a connection line having a length less than a distance between two adjacent second electrodes. Compared to the solution shown in FIG. 1, the length of the connection line is reduced, thereby the purpose of improving visuality may be achieved, facilitating improvement of display quality.

When implemented in practice, the first connection line and the second connection line may include various specific structures, for example, may be metal wires or transparent conductive layers. The larger the number of metal wires is; the more reduction in resistance and improvement in sensitivity can be achieved. In embodiments, the number of the metal wire may be set flexibly according to resistance requirements.

In examples, the first connection line and the second connection line are each a metal wire; or, one of the first connection line and second connection line is a metal wire while the other is a transparent conductive layer; or, the first connection line and the second connection line are each a transparent conductive layer.

In an example, the first electrode and the first connection part are each a transparent conductive layer;

the first connection line, and the first electrode and the first connection part respectively connected with the first connection line are made of a same material and formed into an integral structure if the first connection line is a transparent conductive layer; and/or the second connection line, and the first electrode and the first connection part respectively connected with the second connection line are made of a same material and formed into an integral structure if the second connection line is a transparent conductive layer.

In this embodiment, the first electrode, the first connection part and the corresponding connection line are made of a same material and thus may be formed into an integral structure, which is advantageous for simplifying manufacturing processes and improving production efficiency.

Also, when implemented in practice, the third connection line and the fourth connection line may be made of various materials, for example, may be metal wires or transparent conductive layers. The larger the number of metal wires is; the more reduction in resistance and improvement in sensitivity can be achieved. In embodiments, the number of the metal wire may be set flexibly according to resistance requirements.

In an example, the third connection line and the fourth connection line are each a metal wire.

In an example, one of the third connection line and the fourth connection line which does not extend across the first connection part, is a transparent conductive layer and made of the same material as and formed into an integral structure with the second electrode and the second connection part connected therewith.

It is noted that the first connection part and the second connection part are provided at different positions, thus the third connection line or fourth connection line may be selected as a transparent conductive layer, but it is not possible to form both the third connection line and the fourth connection line in a form of transparent conductive layers because electrical insulation is required when extending across at least portions of the first connection line, the second connection line and the first connection part.

In an example, the second electrode and the second connection part are each a transparent conductive layer.

In this embodiment, the second electrode, the second connection part and the corresponding third or fourth connection line are made of a same material and thus may be formed into an integral structure, which is advantageous for simplifying manufacturing processes and improving production efficiency.

In an example, the material of the transparent conductive layer includes one of Indium Zinc Oxide (IZO) and Indium Tin Oxide (ITO).

In an example, the material of the metal wire includes a metal of low resistance, for example, the material of the metal wire includes one of copper, aluminum and molybdenum, or any combination thereof, or may also include other suitable low-resistance metal materials.

In the present disclosure, the first connection part and the second connection part may have various shapes and arrangements.

In an example, the first connection part is formed into a semi-encirclement (enclosure) structure, and at least a portion of the second connection part is received in the semi-encirclement structure.

In an example, the semi-encirclement structure has an opening, through which the at least a portion of the second connection part is received in the semi-encirclement structure.

In an example, the second connection part is fully received in the semi-encirclement structure.

In an example, the semi-encirclement structure has a U shape, a semicircle shape, an elliptic shape, an arc shape, a sinuous shape or any other suitable shape.

In an example, the second connection part has a rectangular shape, a square shape, a circular shape, an elliptic shape, a rhombus shape or any other suitable shape.

In an example, the first electrode is a touch sensing electrode while the second electrode is a touch drive electrode; or the first electrode is a touch drive electrode while the second electrode is a touch sensing electrode.

A touch screen of embodiments of the present disclosure will be described hereinafter in more detail in conjunction with specific structures of the first connection part and the second connection part.

An inventive concept of the present disclosure will be set forth below by taking a case where the first connection part is arranged in a U shape and the second connection part is arranged in a square shape as an example, but as described above, their arrangements are not limited thereto.

Figure 2:
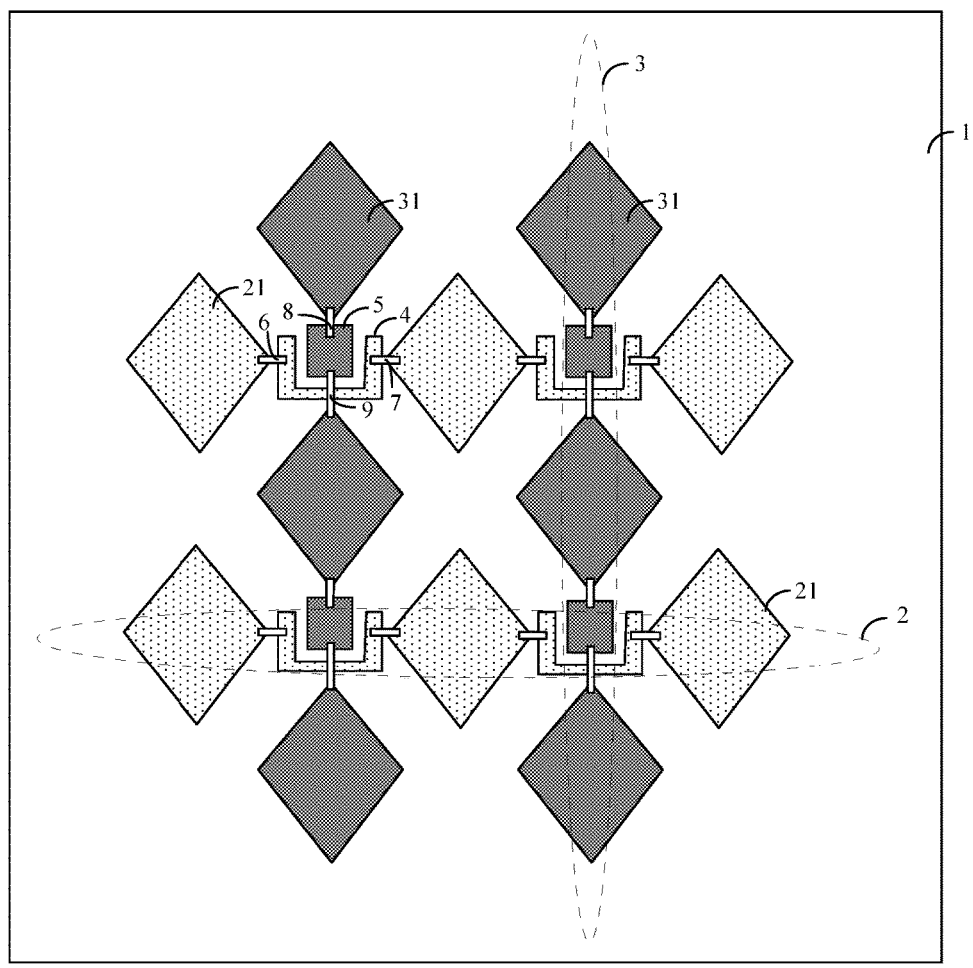
FIG. 2 is a structural schematic diagram of a touch screen according to an embodiment of the present disclosure.

A touch screen shown in FIG. 2 comprises a plurality of first electrode strips 2 and a plurality of second electrode strips 3. The plurality of first electrode strips 2 are disposed on a substrate 1 and extend in a first direction. Generally, at least one of the plurality of first electrode strips 2 includes a plurality of first electrodes 21 spaced apart from one another. In the example shown in FIG. 2, two first electrodes 2 are illustrated and each include a plurality of first electrodes 21.

The plurality of second electrode strips 3 are arranged in the same layer as the plurality of first electrode strips 2 and extend in a second direction crossing the first direction. At least one of the plurality of second electrode strips 3 includes a plurality of second electrodes 31 spaced apart from one another. In the example shown in FIG. 2, two second electrode strips 2 are illustrated and each includes a plurality of second electrodes 31. It is noted that in this example, the plurality of first electrode strips 2 are arranged into row electrodes, while correspondingly, the plurality of second electrode strips 3 are arranged into column electrodes. The first direction and the second direction may cross each other perpendicularly or at an angle, which may be selected by those skilled in the art as required.

In addition, the touch screen further comprises: a first connection line 6, a second connection line 7, a third connection line 8 and a fourth connection line 9 provided in at least one of crossing regions between the plurality of first electrode strips 2 the plurality of second electrode strips 3, and a first connection part 4 and a second connection part 5 provided in the at least one crossing region in the same layer as the first electrodes 21 and the second electrodes 31 and insulated from the first electrodes 21 and the second electrodes 31. In an example, the first connection part 4 and the second connection part 5 are transparent.

The first connection part 4 is electrically connected with two adjacent first electrodes 21 via the first connection line 6 and the second connection line 7 respectively, and a sum of lengths of the first connection line 6 and the second connection line 7 is less than a distance between the two adjacent first electrodes 21.

The second connection part 5 is electrically connected with two adjacent second electrodes 31 via the third connection line 8 and the fourth connection line 9 respectively, and a sum of lengths of the third connection line 8 and the fourth connection line 9 is less than a distance between the two adjacent second electrodes 31.

In this example, the first connection part 4 is a U-shaped structure opening towards one adjacent second electrode 31, and the second connection part 5 is rectangular.

The first electrode 2, the second electrode 3, the first connection part 4 and the second connection part 5 are each a transparent conductive layer. A material of the transparent conductive layer is ITO or IZO.

In addition, the first connection line 6, the second connection line 7, the third connection line 8 and the fourth connection line 9 are each a metal wire. A material of the metal wire may be copper, aluminum, molybdenum or the like.

Further, a transparent insulation layer is provided between the fourth connection line 9 and the first connection part 4 so as to insulate them from each other, for example.

In this embodiment, as can be seen from FIG. 2 that in the crossing region between the first electrode 2 and the second electrode 3, the first connection part 4 is arranged into a U-shaped structure, and a sum of a distance between the second connection part 5 and the second electrode 31 close to the bottom of the U-shaped structure and a distance between the second connection part and the second electrode 31 towards which the U-shaped structure opens may be less than a distance between two adjacent second electrodes 31, such that lengths of the third connection line 8 and the fourth connection line 9, which would otherwise extend to the two adjacent second electrodes 31, may be reduced, that is, the metal wire connecting the two adjacent second electrodes 31 is shortened, thereby achieving the purpose of improving the visuality.

A sum of distances between the first connection part 4 and two adjacent first electrodes 21 is also less than a distance between the two adjacent first electrodes 21, such that lengths of the first connection line 6 and the second connection line 7, which would otherwise extend to the two adjacent first electrodes 21, may be reduced, thereby achieving the purpose of improving the visuality.

Further, the first connection line 6, the second connection line 7, the third connection line 8 and the fourth connection line 9 are each a metal wire, such that the resistance may be reduced greatly and the sensitivity is improved, and that lengths of the respective connection lines may be flexibly set in order to ensue avoiding occurrence of adverse visuality defects while meeting requirements of sensitivity.

It is noted that it will be appreciated from the touch screen shown in FIG. 2, different forms of the first connection part 4 and the second connection part 5 may be used to reduce the length of the metal wire which would otherwise connect the adjacent first electrodes or second electrodes, that is, it can partly avoid occurrence of adverse visuality defects; for example, the first connection part and/or the second connection part may be directly used to partly substitute the metal wire for connecting the adjacent first electrodes and/or second electrodes.

Figure 3:
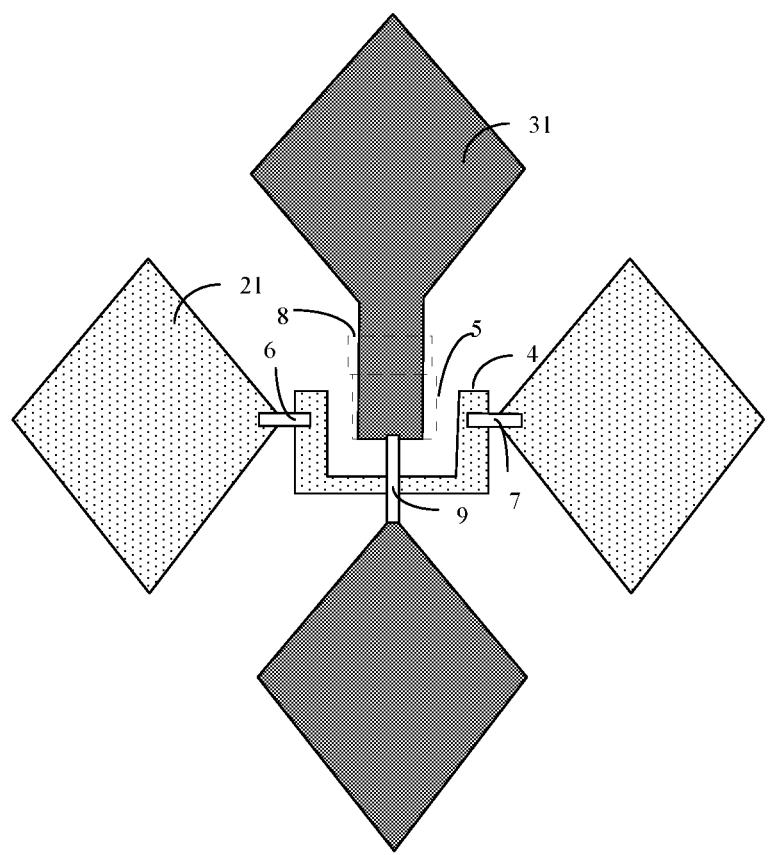
FIG. 3 is a structural schematic diagram of a variant example of a touch screen according to an embodiment of the present disclosure.

As shown in FIG. 3, on basis of the structure of the touch screen shown in FIG. 2, the first connection line 6, the second connection line 7 and the fourth connection line 9 are each a metal wire, the third connection line 8 is a transparent conductive layer rather than metal wire, and the third connection line 8 is made of the same material as the second connection part 5 and the second electrode 31; in this case, the third connection line 8 and the second connection part 5 and the second electrode 31 respectively connected with the third connection line are formed into an integral structure. As such, these three structures may be manufactured through a same process during production, which is advantageous for simplifying manufacturing processes and improving production efficiency.

Figure 4:
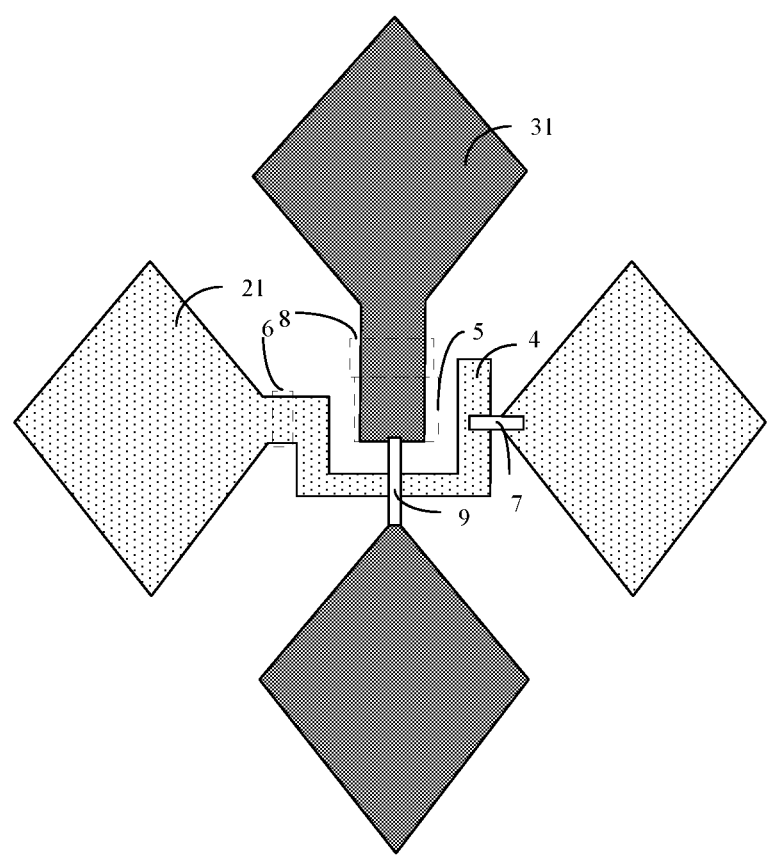
FIG. 4 is a structural schematic diagram of another variant example of a touch screen according to an embodiment of the present disclosure.

As shown in FIG. 4, on basis of the structure of the touch screen shown in FIG. 2, the second connection line 7 and the fourth connection line 9 are each a metal wire, the first connection line 6 and the third connection line 8 are each a transparent conductive layer rather than metal wire, the first connection line 6 and the first electrode 21 and the first connection part 4 respectively connected with the first connection line are made of a same material, and the third connection line 8 is made of the same material as the second connection part 5 and the second electrode 31. In this case, the first connection line 6 and the first electrode 21 and the first connection part 4 respectively connected with the first connection line are formed into an integral structure, and the third connection line 8 and the second connection part 5 and the second electrode 31 respectively connected with the third connection line are formed into an integral structure, which is advantageous for simplifying manufacturing processes and improving production efficiency.

Figure 5:
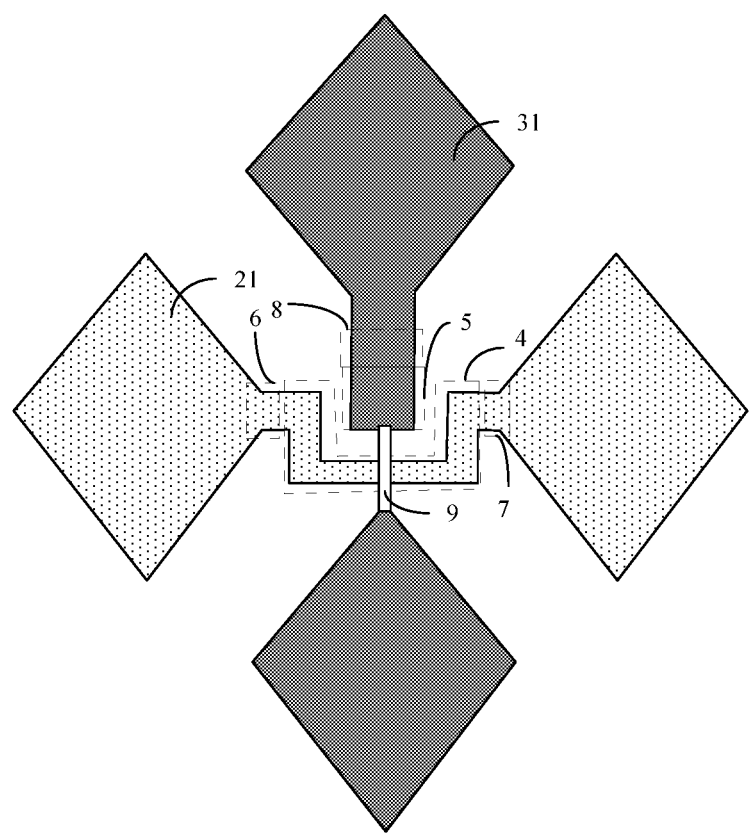
FIG. 5 is a structural schematic diagram of a further variant example of a touch screen according to an embodiment of the present disclosure.

As shown in FIG. 5, on basis of the structure of the touch screen shown in FIG. 2, the fourth connection line 9 is a metal wire, the first connection line 6, the second connection line 7 and the third connection line 8 are each a transparent conductive layer rather than metal wire, the first connection line 6, the second connection line 7, the first electrode 21 and the first connection part 4 are made of a same material, and the third connection line 8 is made of the same material as the second connection part 5 and the second electrode 31. In this case, the first connection line 6, the second connection line 7, the first electrode 21 and the first connection part 4 are formed into an integral structure, and the third connection line 8 and the second connection part 5 and the second electrode 31 respectively connected with the third connection line are formed into an integral structure, which is advantageous for simplifying manufacturing processes and improving production efficiency, while achieving the purpose of improving the visuality.

As can be seen from the above structures of the touch screen shown in FIG. 2 to FIG. 5, the number of the metal wire may be set flexibly so as to meet actual requirements of resistance.

In an example, the second connection part 5 may be also be arranged to be fully received in the first connection part 4, for example, the second connection part 5 extends to the U opening of the first connection part 4 formed into a U-shaped structure such that the second connection part 5 is close to the first connection part 4 as much as possible so as to further reduce the length of the fourth connection line 9, thereby further improving the visuality.

In addition, another embodiment of the present disclosure further provides a display apparatus comprising the touch screen of any type as described above.

In the touch screen and the display apparatus according to the embodiments of the present disclosure, in the crossing region between the first electrode and the second electrode, two adjacent first electrodes are connected with the first connection part by a connection line having a length less than a distance between the two adjacent first electrodes, and two adjacent second electrodes are connected with the second connection part by a connection line having a length less than a distance between the two adjacent second electrodes, such that the length of the connection line may be reduced, thereby the purpose of improving visuality may be achieved, facilitating improvement of display quality.

Obviously, various changes and modifications may be made to the present disclosure by those skilled in the art without departing from the principle and spirit of the present disclosure. As such, the present applicant is intended to cover these changes and modifications if these changes and modifications fall within scopes of the present disclosure defined in the claims and their equivalents.

What is claimed is:

1. A touch screen, comprising:
   a plurality of first electrode strips arranged on a substrate and extending in a first direction, at least one of the plurality of first electrode strips comprising a plurality of first electrodes spaced apart from each other;
   a plurality of second electrode strips extending in a second direction crossing the first direction and disposed in the same layer as the plurality of first electrode strips, at least one of the plurality of second electrode strips comprising a plurality of second electrodes spaced apart from each other;
   a first connection line, a second connection line, a third connection line and a fourth connection line arranged in at least one crossing region of the plurality of first electrode strips with the plurality of second electrode strips; and
   a transparent first connection part and a transparent second connection part provided within the at least one crossing region in the same layer as the plurality of first electrode strips and the plurality of second electrode strips, the second connection part being insulated from the first connection part;
   wherein the first connection part is electrically connected with two adjacent ones of said first electrodes via the first connection line and the second connection line respectively, and a sum of lengths of the first connection line and the second connection line is less than a distance between the two adjacent ones of the first electrodes; and
   wherein the second connection part is electrically connected with two adjacent ones of said second electrodes via the third connection line and the fourth connection line respectively, and a sum of lengths of the third connection line and the fourth connection line is less than a distance between the two adjacent ones of the second electrodes.

2. The touch screen according to claim 1, wherein the first connection part is formed into a semi-encirclement structure and at least a portion of the second connection part is received in the semi-encirclement structure.

3. The touch screen according to claim 2, wherein the semi-encirclement structure has an opening, through which the at least a portion of the second connection part is received in the semi-encirclement structure.

4. The touch screen according to claim 3, wherein the second connection part is fully received in the semi-encirclement structure.

5. The touch screen according to claim 1, wherein at least one of the third connection line and the fourth connection line extends across the first connection part to be electrically connected with the second electrode and is electrically insulated from the first connection part.

6. The touch screen according to claim 2, wherein the semi-encirclement structure has a U shape, a semicircle shape, an elliptic shape, an arc shape or a sinuous shape.

7. The touch screen according to claim 1, wherein the second connection part has a rectangular shape, a square shape, a circular shape, an elliptic shape or a rhombus shape.

8. The touch screen according to claim 1, wherein:
the first connection line and the second connection line are each a metal wire; or
one of the first connection line and second connection line is a metal wire while the other is a transparent conductive layer; or
the first connection line and the second connection line are each a transparent conductive layer.

9. The touch screen according to claim 8, wherein the first electrode and the first connection part are each a transparent conductive layer;
the first connection line, and the first electrode and the first connection part respectively connected with the first connection line are made of a same material and formed into an integral structure, and the first connection line is a transparent conductive layer; and/or
the second connection line, and the first electrode and the first connection part respectively connected with the second connection line are made of a same material and formed into an integral structure, and the second connection line is a transparent conductive layer.

10. The touch screen according to claim 1, wherein the third connection line and the fourth connection line are each a metal wire.

11. The touch screen according to claim 1, wherein one of the third connection line and the fourth connection line, which does not extend across the first connection part, is a transparent conductive layer, and is made of the same material as and formed into an integral structure with the second electrode and the second connection part connected therewith.

12. The touch screen according to claim 8, wherein the first connection line and the second connection line are each a transparent conductive layer, and a material of the transparent conductive layer comprises one of Indium Zinc Oxide and Indium Tin Oxide, or any combination thereof.

13. The touch screen according to claim 8, wherein the first connection line and the second connection line are each a metal wire, or one of the first connection line and second connection line is a metal wire while the other is a transparent conductive layer, and a material of the metal wire comprises one of copper, aluminum and molybdenum, or any combination thereof.

14. The touch screen according to claim 1, wherein one of the first electrode and the second electrode is a touch sensing electrode while the other is a touch drive electrode.

15. A display apparatus, comprising the touch screen according to claim 1.

16. The touch screen according to claim 2, wherein at least one of the third connection line and the fourth connection line extends across the first connection part to be electrically connected with the second electrode and is electrically insulated from the first connection part.

17. The touch screen according to claim 3, wherein at least one of the third connection line and the fourth connection line extends across the first connection part to be electrically connected with the second electrode and is electrically insulated from the first connection part.

18. The touch screen according to claim 4, wherein at least one of the third connection line and the fourth connection line extends across the first connection part to be electrically connected with the second electrode and is electrically insulated from the first connection part.

19. The touch screen according to claim 3, wherein the semi-encirclement structure has a U shape, a semicircle shape, an elliptic shape, an arc shape or a sinuous shape; and
the second connection part has a rectangular shape, a square shape, a circular shape, an elliptic shape or a rhombus shape.

20. The touch screen according to claim 18, wherein the semi-encirclement structure has a U shape, a semicircle shape, an elliptic shape, an arc shape or a sinuous shape; and
the second connection part has a rectangular shape, a square shape, a circular shape, an elliptic shape or a rhombus shape.

* * * * *